(No Model.)　　　　　　E. F. STODDARD.　　　　3 Sheets—Sheet 1.
WHEEL HARROW.

No. 312,772.　　　　　　　　　　Patented Feb. 24, 1885.

Attest
Carl Spengel
Otto Richter

Inventor
E. Fowler Stoddard
by Stem & Cook his Atty's (No Model.) 3 Sheets—Sheet 2.

E. F. STODDARD.
WHEEL HARROW.

No. 312,772. Patented Feb. 24, 1885.

Attest
Carl Spengel
Otto Richter

Inventor
E. Fowler Stoddard
by Stewart Cook his Atty's (No Model.) 3 Sheets—Sheet 3.
E. F. STODDARD.
WHEEL HARROW.
No. 312,772. Patented Feb. 24, 1885.
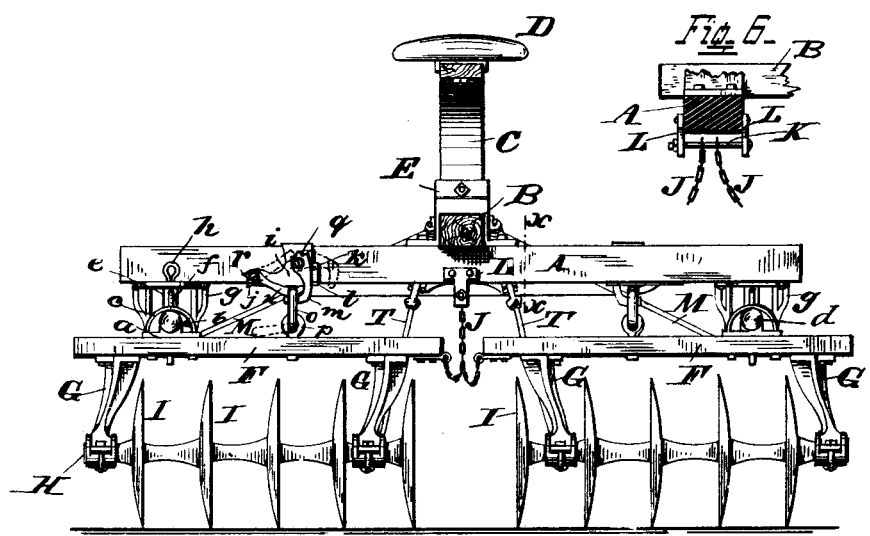
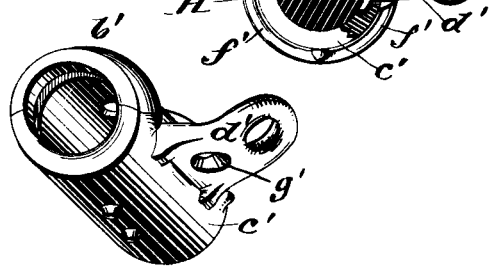
Attest
Carl Spengel
Otto Richter
Inventor
E. Fowler Stoddard
by Stembeck his Atty's

UNITED STATES PATENT OFFICE.

E. FOWLER STODDARD, OF DAYTON, OHIO.

WHEEL-HARROW.

SPECIFICATION forming part of Letters Patent No. 312,772, dated February 24, 1885.

Application filed June 23, 1884. (No model.)

*To all whom it may concern:*

Be it known that I, E. FOWLER STODDARD, a citizen of the United States, residing at Dayton, in the county of Montgomery and State of Ohio, have invented certain new and useful Improvements in Wheel-Harrows, of which the following is a full, clear, and exact description, reference being had to the accompanying drawings, forming a part of this specification.

My invention relates to that class of harrows or cultivators having gangs of disks, preferably concavo-convex disks, adjustably connected to the draft-frame, and arranged on each side of the tongue, for the purpose of changing the angles of the gangs relatively to each other; and the novelty of my invention consists, first, in so connecting the draft-frame, disks-gangs, and double-tree that the sliding of the double-tree forward or back regulates the position of the disk-gangs and enables them to be brought into a straight line or parallel positions, or angling to each other, and to be locked in any of their adjusted positions by the operator from his seat on the machine without loss of time and with no expenditure of labor; second, in so connecting the draft-frame and disk-gangs that the harrow may be either a rigid or a flexible harrow, as desired, though in either case its gangs can be relatively adjusted to angling or straight or parallel positions; third, in the construction, combinations, and arrangements of the parts, all as will be herewith set forth and specifically claimed.

Figure 1:
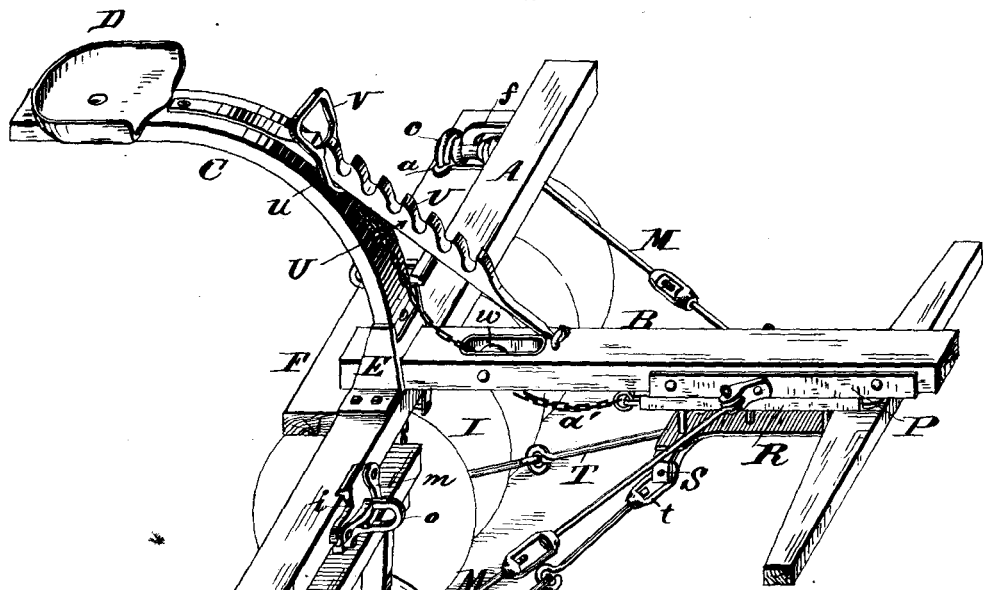
Figure 7:
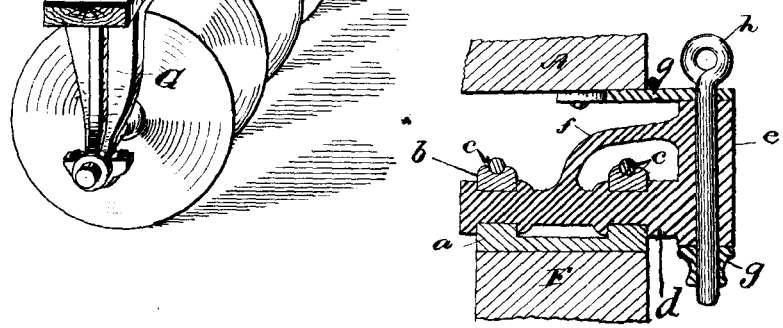
Figure 2:
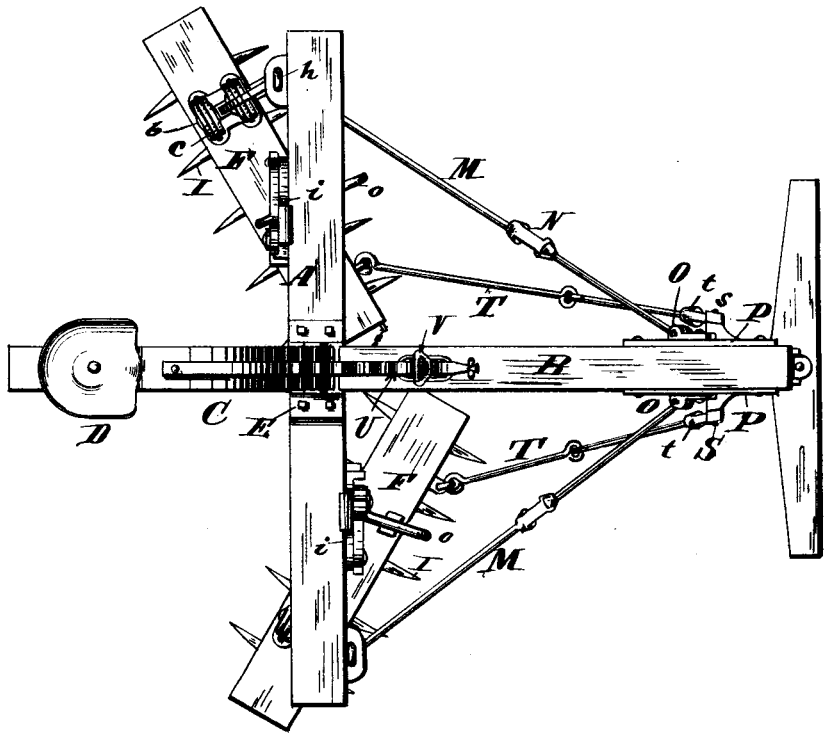

In the accompanying drawings, Figure. 1, Sheet 1, is a perspective view of my improved harrow. Fig. 2, Sheet 2, is a plan view of the same. Fig. 3, Sheet 3, is a rear elevation of the same. Fig. 4, Sheet 3, is an enlarged detail view, partly in section, of one of the boxes and couplings. Fig. 5, Sheet 3, is a perspective view of the same. Fig. 6, Sheet 3, is a detail sectional view through the line *x x* of Fig. 3. Fig. 7, Sheet 1, is an enlarged central section of the universal joint.

The same letters of reference are used to indicate corresponding parts in all the figures.

The draft-frame of the harrow consists, essentially, of a stout transverse beam or bar, A, to which is bolted or suitably secured at or about its middle the rear end of the tongue B, and the seat-beam C, supporting the driver's seat D, which can be made adjustable thereon. In this instance the casting E is employed to unite the parts, as shown.

To the under side of the beam A, at or near its ends, are connected by universal joints, at or near their outer ends, the two gang-beams F, having pendent hanger-brackets G, to which the disk-shafts H, carrying the disks I, are journaled, as shown. The universal joints uniting the gang-beams to the beam A are composed of the horizontal double pillow-casting *a*, with grooved blocks *b*, over and around which, and passing down through perforations in the casting *a* and beams F, are clips *c*, secured by nuts on the under side of the beams. Journaled in these pillow-blocks is the horizontal extension of the casting *d*, having a tubular vertical portion, *e*, and a strengthening-rib, *f*, extending from the upper end of the tubular portion over and between the pillow-blocks, as shown.

To the under side of the beams A are attached bracket-castings *g*, between the upper and lower plates of which is vertically journaled by a bolt or pivot, *h*, the tubular portion *e* of the casting *d*. In this manner it will be readily understood the gang-beams can swing horizontally to change their angles, and can swing vertically to meet the inequalities of the ground when it is desired to have a flexible or hinged harrow. In other words, the coupling is a universal joint.

In order that the harrow may clear itself properly of the accumulated trash at the middle when the two gangs are angling, and that the two inside disks may work without interfering at proper distance apart, I couple one of the gangs, as shown, directly under the beam A, and the other in the rear of said beam, so that the two beams do not, accurately speaking, come into a straight line, but into parallel lines.

To render the harrow a convertible, flexible, or rigid harrow—by which term "rigid" is meant a harrow which can be adjusted backward or forward in parallel lines to angling position, or vice versa, but cannot be tilted vertically to meet inequalities in the ground—I employ the following instrumentalities: The plates *i*, provided with stop-lugs *j k l*, and secured, the one upon the front and the other upon the rear side of the beam A, have pivoted to them the hooks m and the pivoted locking-dogs n. As seen in Fig. 3, the hooks m can swing down so that their engaging ends are below the beam A, in which position they are stopped from swinging backward by the lug l, and in which position also they can receive the elongated shackle or staple o, which is pivoted transversely upon the gang-beams F by means of lugs p or in any other suitable manner. When thus engaged, the dog or latch n is dropped down, and, resting upon the end of the hook, prevents the disengagement of the shackle, as seen in Fig. 3. In this manner, while the gang-beams can swing in horizontal planes, their vertical play is stopped and a rigid harrow is produced. This lock can be instantly broken when desired to convert the harrow into a flexible harrow by merely raising the latch-dog n sufficiently to swing the shackle off the hook and turn it down upon the beam F, as seen by the dotted lines in Fig. 3.

To prevent the accidental re-engagement of the shackle, the hook m can be turned up and over, so as to rest upon the lug k, and the dog n can be dropped into a notch, q, at the butt of the hook, whereby both hook and dog are prevented from being turned or falling down. This position of the parts is also indicated by the dotted lines in Fig. 3. The dog is also provided with a stop or shoulder, r, which comes in contact with the lug j, which limits its play within the points of its desired adjustments.

To support the inner ends of the gangs and to limit their play when the harrow is used as a flexible harrow are chains J, suitably connected to the inner ends of the gang-beams F at their lower ends, and sliding upon a horizontal removable bolt, K, at their upper ends, as seen in Fig. 6, whereby the chains can follow the adjusted positions of the gang-beams without having their slack taken up. The bolt K is supported in lugs L upon the front and rear sides of the beam A, and can be readily removed when it is desired to adjust the lengths of the chains.

To stiffen the frame and support the couplings, I employ the brace-rods M, preferably in two parts and united by tension-nuts N, and whose lower ends embrace the lower ends of the coupling-brackets g, and whose upper forward ends are pivoted between lugs O, suitably secured to the tongue or pole. In this manner all torsional strain is taken off of the couplings, and they are firmly supported both above and below their pivotal axes.

Upon the under side of the pole or tongue, and suitably supported by means of plates P, secured to the sides of the tongue, and with inturned lower edges, is a backward and forward sliding casting, R, to the forward end of which the double-tree is pivoted, and from lugs or ears s at the lower rear sides of which draft-links T extend back and are connected to the inner journal boxes of the disk-gangs. These links can be adjusted to shorten or lengthen them by the shackle-nuts t, as will be readily understood, and for a purpose hereinafter explained.

Extending from the upper side of the tongue up to and secured to the seat-beam is any suitable rack-bar, U, over which is fitted an engaging link, u, provided with a handle or suitable grasping device, V, and from the lower end of which link a chain extends down through a slot in the pole, in which is suitably journaled a grooved sheave, w, under said sheave, and has its forward end connected to the rear end of the sliding piece or casting R. The length of this chain is such that when the link engages with the uppermost notch of the rack the disk-gangs will occupy a straight line or parallel position, and when it engages with the lowest notch of the rack the disk-gangs will occupy their extreme angling positions. From this contruction it will be readily understood that to shift the gangs from a straight line or parallel position to any desired degree of angling, or vice versa, it is only necessary for the driver upon his seat on the machine to raise the link and place it in any one of the notches desired. Supposing the harrow to be at its extreme position of angling and it is desired to set it to a less angle, or to a straight line or parallel position, the driver would merely stop his team and back them sufficiently to relieve the draft upon the double-tree and to slacken the chain a', whereupon he could raise the link, drawing back the double-tree as far as necessary to set the link in any of the upper notches desired. Upon again starting the team the double-tree is drawn forward until the chain a' is drawn taut, and then as the machine is drawn forward, owing to the manner in which the gangs are pivoted to the main frame, the resistance of the earth upon the disks will draw back the gangs until the draft-links T become taut, when the machine will proceed forward in its adjusted position; hence it will be seen that the connecting draft-links T should be, as they are shown, in more than one coupled link, and not rigid, for their only office is to draw and not to push. Chains would answer equally well in their stead. If these links were not flexible, the driver would have to have sufficient power to force back the gangs by drawing back the double-tree, as will be at once apparent, and the automatic setting of the gangs by the movement of the team and the resistance of the earth would be lost. Now, to set the gangs from a straight line or parallel position, or from a less angle to any greater degree of angling desired, it is only necessary for the driver to lift and place the link in any one of the lower notches. This adjustment would of course slacken the chain a' and permit the double-tree to be drawn forward by the team. The movement forward of the double-tree by the draft of the team exerts the power of the team, through the medium of the draft-links T, upon the gang-beams, owing to the manner in which they are pivoted, to draw them to a greater angling position, and continues to so draw them until the forward movement of the double-tree independent of the machine is arrested by the chain $a'$ becoming taut, when the machine as a whole begins to move forward. In this way I dispense with all leverage and the sliding forward or back of the pole in order to set my disk-gang, as will be readily understood.

My improved box and coupling is shown more particularly in Figs. 4 and 5, where $b'$ is the upper half of the box, which fits up in a recess in the under side of the hanger G. $c'$ is the lower half, and $d'$ the coupling-ear, which is dovetailed or clamped between the upper and lower halves, as shown. A clip, $f''$, embraces the box, passes through a perforation, $g'$, in the ear and up through the lugs upon the hanger, where it is secured by nuts $i'$, as shown. This construction is very strong and simple, and in case of breakage enables the parts to be readily replaced.

The purpose of the adjustment of the draft-links T so that they may be independently lengthened or shortened is very important, as it enables either of the gangs to be adjusted to equalize the draft, or for other purposes, and particularly where two horses are used upon one side of the pole and one on the other.

While I have shown and described the double-tree as preferably a sliding double-tree, I do not limit myself to such construction alone, as it is obvious that the double-tree might be connected to a swinging arm hung to the pole, and to which the chain could be attached, and by which the same result would be accomplished by the forward and backward movement of the double-tree.

The harrow may be provided with scrapers such as shown and described in my patent, No. 298,911, of May 20, 1884, or may have any suitable scrapers.

I am aware that sliding double-trees are old, and that combined rigid and flexible wheel-harrows are old; but,

Having thus fully described my invention, I claim—

1. In a wheel or disk harrow, the combination, with the main frame and the wheel-gangs pivoted thereto, of an independently backwardly and forwardly movable double-tree, with connecting mechanism, whereby the movement of said double-tree backward or forward causes the simultaneous shifting of the relative positions of both the wheel-gangs from a straight line or parallel position to an angling position, or vice versa.

2. In a wheel or disk harrow, the combination, with the main frame and the wheel-gangs pivoted thereto, of an adjustable and independently backwardly and forwardly movable double-tree, with connecting mechanism, whereby the movement of said double-tree backward or forward causes the simultaneous shifting of the relative position of both the wheel-gangs from a straight line or parallel position to any angle desired, or vice versa.

3. In a wheel or disk harrow, the combination, with the main frame and the wheel-gangs pivoted thereto, of a sliding double-tree, with connecting mechanism, whereby the sliding of said double-tree backward or forward causes the simultaneous shifting of the relative position of both the wheel-gangs from a straight line or parallel position to an angling position, or vice versa.

4. In a wheel or disk harrow, the combination, with the main frame and the wheel-gangs pivoted thereto, of a sliding adjustable double-tree, with connecting mechanism, whereby the sliding of said double-tree backward or forward causes the simultaneous shifting of the relative position of both the wheel-gangs from a straight line or parallel position to any angle desired, or vice versa.

5. In a wheel or disk harrow, the combination, with the main frame and the wheel-gangs pivoted thereto, of an independently backwardly and forwardly movable double-tree for causing the simultaneous shifting of the relative position of both the wheel-gangs, and mechanism for moving and regulating the extent of the adjustment of said double-tree backward or forward.

6. In a wheel or disk harrow, the combination, with the main frame and the wheel-gangs pivoted thereto, of an independently backwardly and forwardly movable double-tree connected by jointed draft-links to the wheel-gangs, whereby the resistance of the earth effects the shifting of the gang-beams in one direction as the machine is drawn forward.

7. In a wheel or disk harrow, the combination, with the main frame, of the wheel-gangs pivoted thereto at points between the centers and ends of said gangs, and an independently backwardly and forwardly movable double-tree connected to the wheel-gangs, whereby the resistance of the earth effects the shifting of the gang-beams.

8. In a wheel or disk harrow, the combination, with the main frame and the wheel-gangs pivoted thereto, of a forwardly and backwardly adjustable double-tree connected by draft-links to the disk-gangs, and mechanism for operating and limiting the movement of said double-tree, substantially as described.

9. In a wheel or disk harrow, the combination, with the main frame and the wheel-gangs pivoted thereto, of the sliding double-tree connected to the disk-gangs, and mechanism for operating and limiting the forward movement of the double-tree.

10. In a wheel or disk harrow having a double-tree for regulating the adjustment of the disk-gangs, the combination, with the double-tree, of a chain, a rack, and engaging link, whereby the forward movement of the double-tree can be adjusted at will.

11. In a wheel or disk harrow, the combination, with the main frame, of the wheel-gangs pivoted thereto by universal joints, and provided with coupling-shackles adapted to engage with hooks upon the main frame to form a rigid connection, and at the same time permit the gangs to be shifted in perfectly horizontal planes, substantially as described.

12. In a wheel or disk harrow, the coupling composed of the parts $a\ b\ c\ e\ f\ g\ h$, constructed and arranged substantially in the manner and for the purpose specified.

13. In a wheel or disk harrow, the combination, with the pivoted shackles $o$, of the plate $i$, provided with stop-lugs $j\ k\ l$, hook $m$, and the pivoted locking-dog $n$, the parts constructed and arranged in the manner and for the purpose specified.

14. In a disk-harrow, the combination and arrangement of the engaging link $u$, rack-bar U, chain $a'$, sheave $w$, and sliding double-tree, substantially as and for the purpose specified.

15. In a disk-harrow, the combination, with a forwardly and backwardly adjustable double-tree for causing the simultaneous shifting of the wheel-gangs, of draft-links connected at their forward ends to said double-tree, and connected at their rear ends to the wheel-gangs at points in the plane of their revolving axes, substantially as described.

16. In a disk-harrow, the combination, with a forwardly and backwardly adjustable double-tree for causing the simultaneous shifting of the wheel-gangs, of separately-adjustable draft-links connected at their forward ends to said double-tree and connected at their rear ends to the disk-gangs, substantially as described.

17. In a wheel-harrow, the combined box and draft couplings composed of the parts $b'$, $c'$, and $d'$, fitted to each other and to the hanger G, and united and secured by the clip $f'$, substantially as and for the purpose specified.

E. FOWLER STODDARD.

Witnesses:
   CHARLES E. BROWN,
   OTTO RICHTER.